United States Patent [19]

Stevenson et al.

[11] 4,440,588
[45] Apr. 3, 1984

[54] HOT AIR WELDER FOR WELDING ROOFING MATERIAL

[76] Inventors: Edward J. Stevenson, 2727 Los Feliz, Thousand Oaks; Donald E. Dean, 3065 Steven White Dr. #12, San Pedro, both of Calif. 90731

[21] Appl. No.: 353,168

[22] Filed: Mar. 1, 1982

[51] Int. Cl.³ .............................................. B32B 31/08
[52] U.S. Cl. ................................... 156/157; 156/497; 156/574; 156/578
[58] Field of Search ................ 156/497, 574, 578, 157

[56] References Cited

U.S. PATENT DOCUMENTS

| | | | |
|---|---|---|---|
| 2,196,326 | 4/1940 | Robinson | 156/497 |
| 4,204,904 | 5/1980 | Tabor | 156/497 |
| 4,239,581 | 12/1980 | Lang | 156/497 |
| 4,259,142 | 3/1981 | Kortepeter | 156/578 |

FOREIGN PATENT DOCUMENTS 49-40876 11/1974 Japan .
555604 8/1979 U.S.S.R. .

*Primary Examiner*—Caleb Weston
*Attorney, Agent, or Firm*—Fulwider, Patton, Rieber, Lee & Utecht

[57] ABSTRACT

An improved hot air welder which includes a blower communicating with a heater assembly mounted on a chassis wherein the chassis has coupled thereto a pressure wheel and tracking wheel, includes means for adjusting the angle of orientation of the pressure wheel and tracking wheel with respect to the chassis in order to obtain a proper pressure bias through the pressure wheel on the seam over which the pressure wheel rides, and for providing a proper orientation of the tracking wheel according to the slope of the roof upon which the welder is driven. The welder can accommodate inside and outside seams with equal facility. The air dam has an improved roller track to more evenly apply pressure against the underlying roofing material. A guide member slidably engages and accommodates roofing material from both the left and right sides to assist in guiding the hot air welder along the seam to be welded. A constant speed blower controlled by a gate valve controls the amount of air to the heater assembly. An alarm is included within the heater assembly for sensing insufficient temperature when the welder is operating and for sounding an audible alarm to indicate to the operator that insufficient heat is being delivered to the seam to manufacture a suitable weld.

28 Claims, 23 Drawing Figures

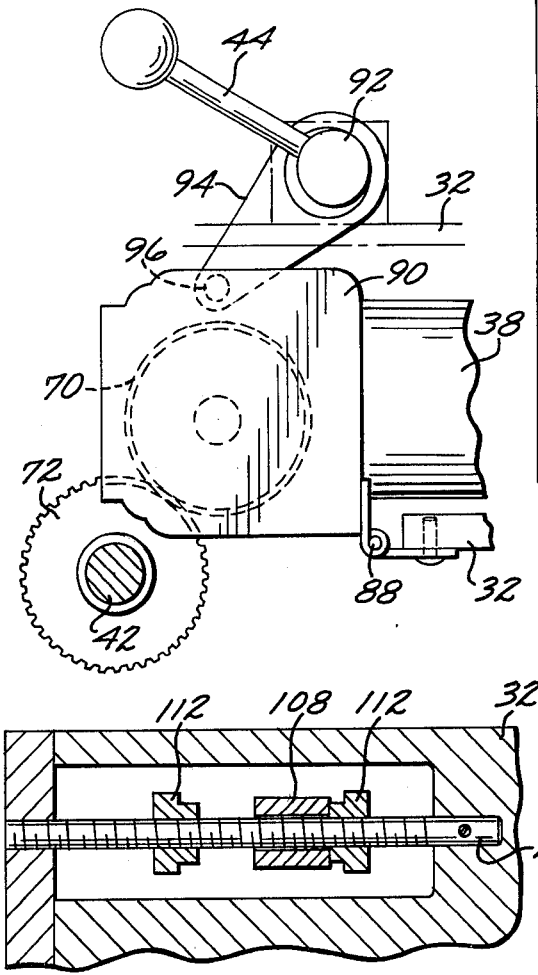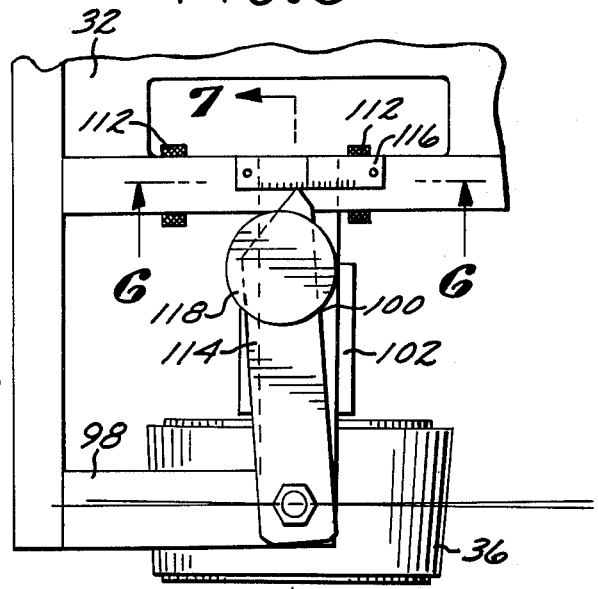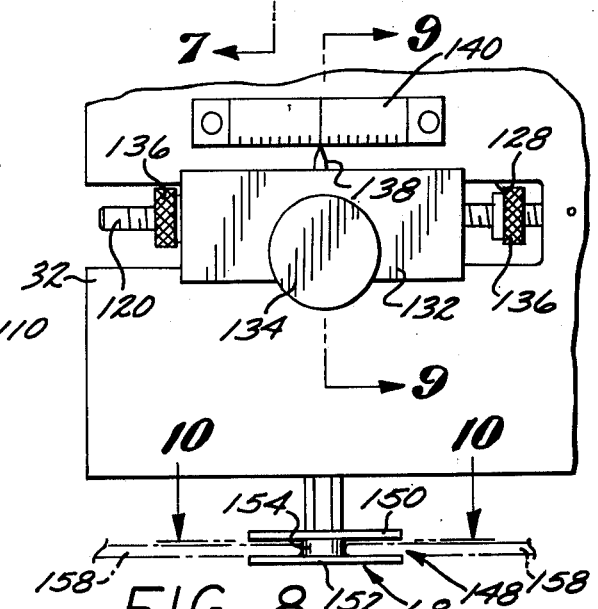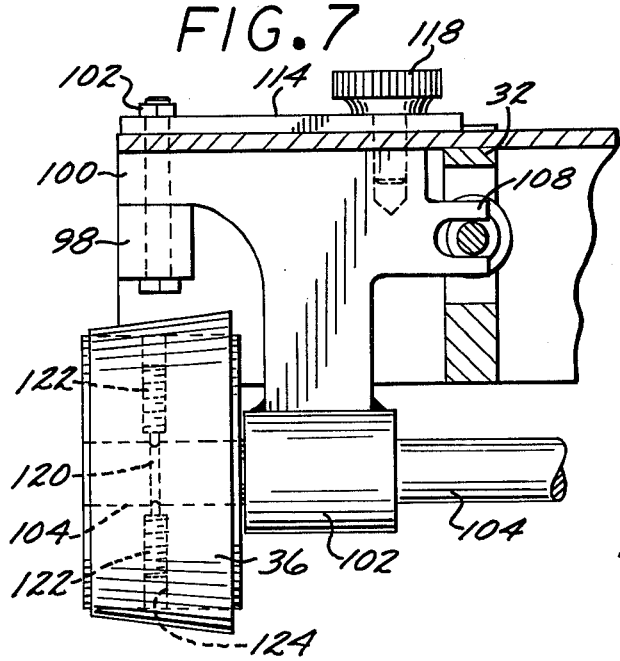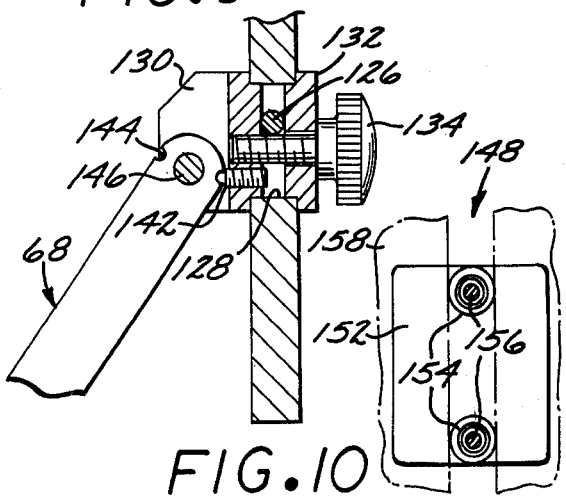

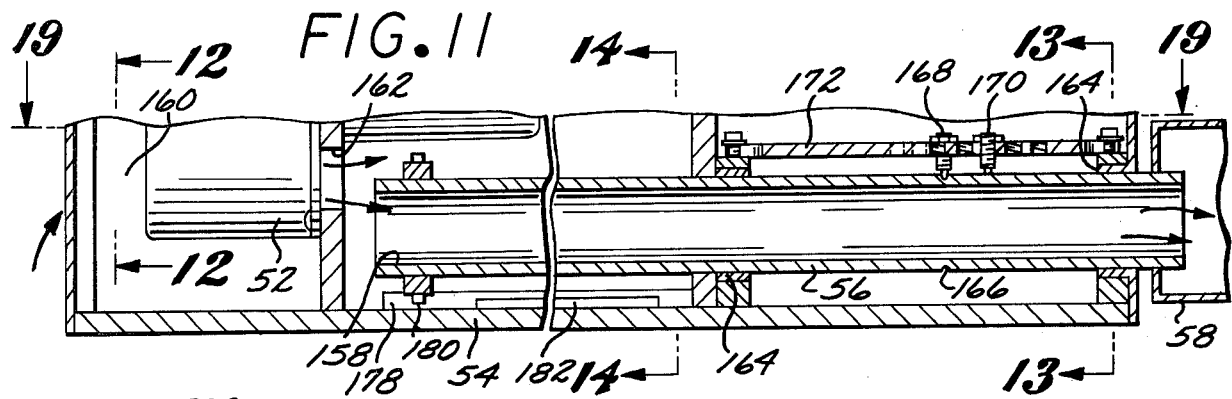
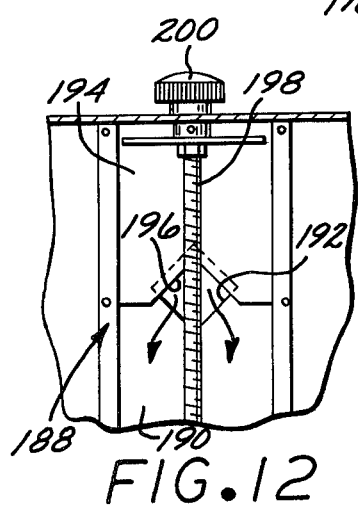
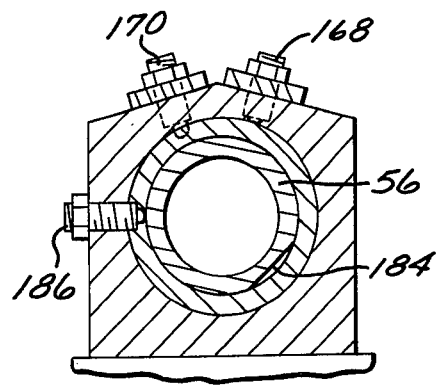
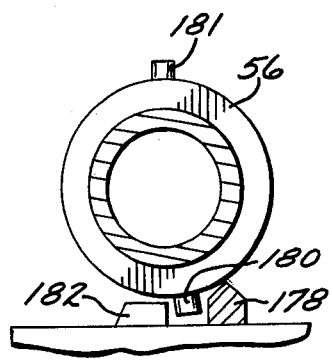
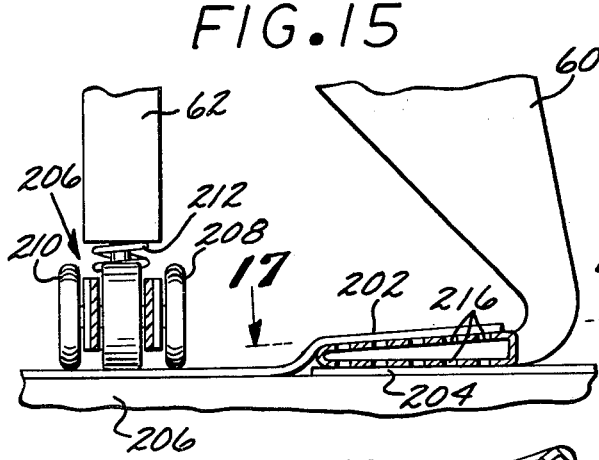
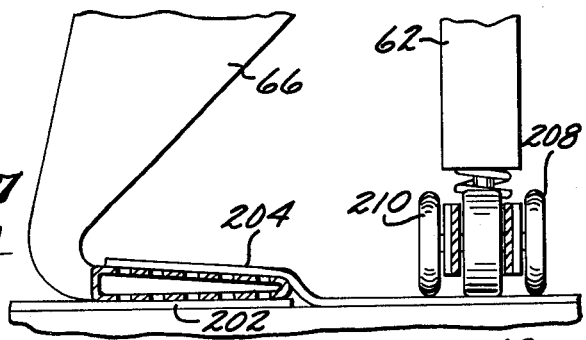
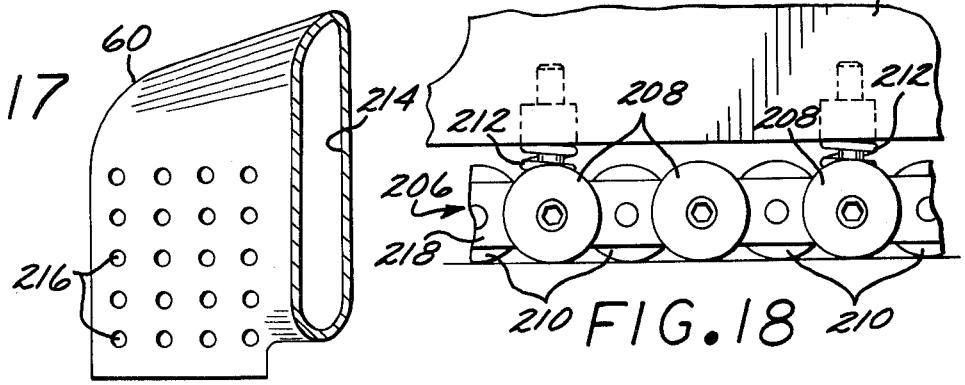

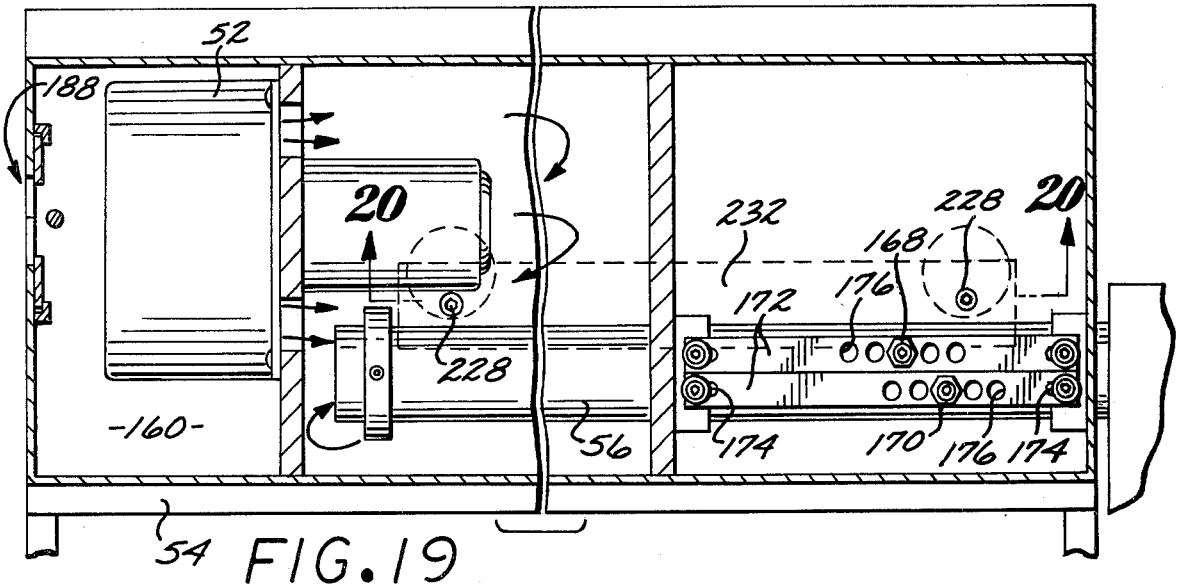
FIG. 19
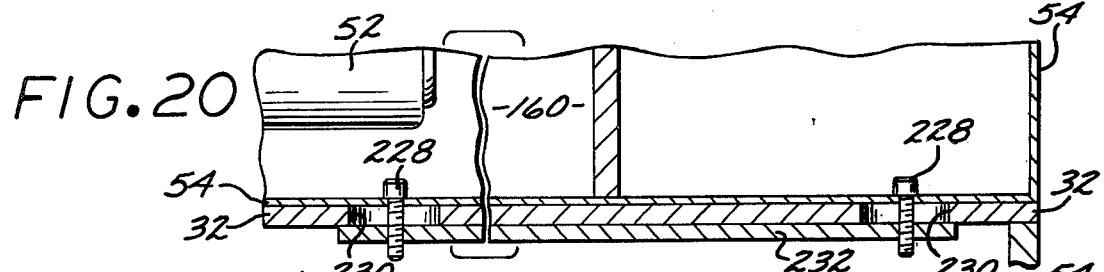
FIG. 20
FIG. 21
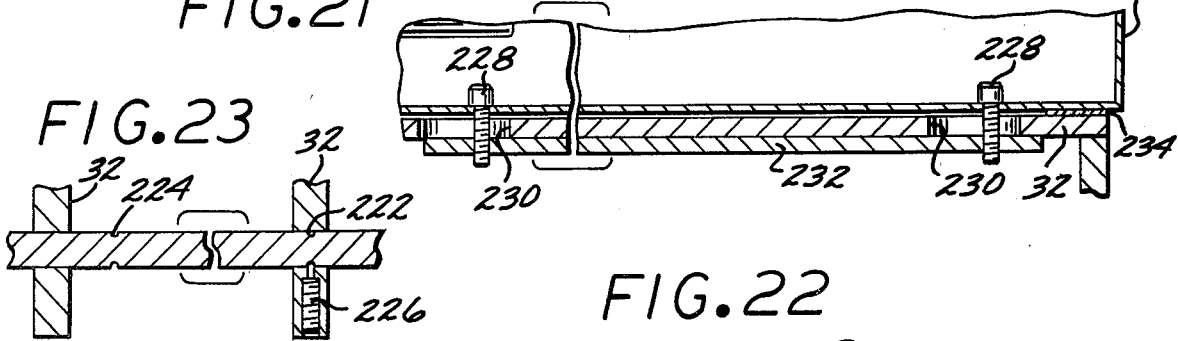
FIG. 23
FIG. 22
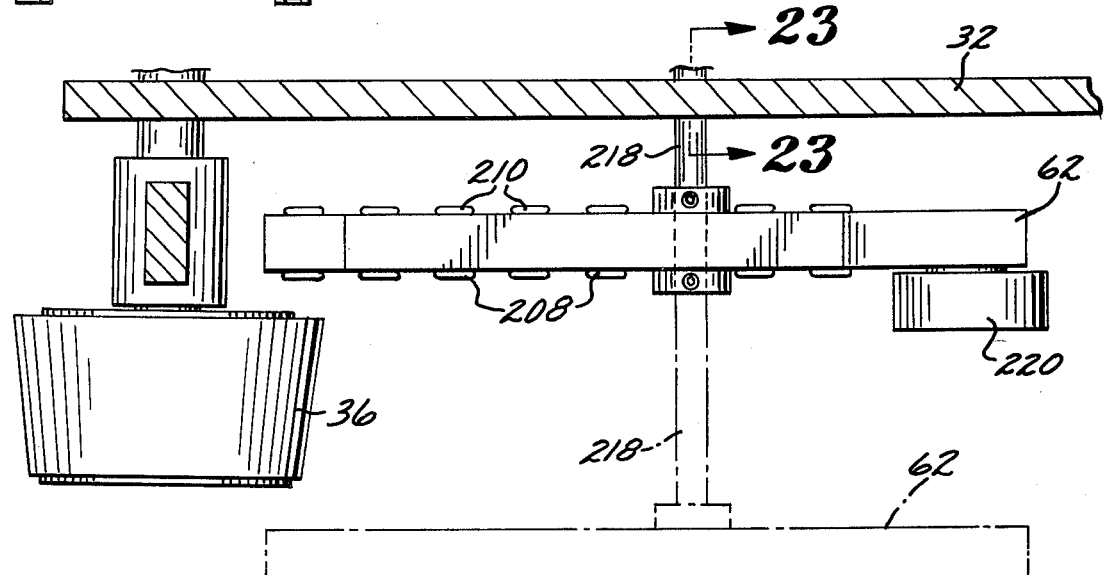

HOT AIR WELDER FOR WELDING ROOFING MATERIAL

BACKGROUND OF THE INVENTION

1. Field of the Invention.

The present invention relates to the field of hot air welders used for welding thermoplastic material, and in particular, relates to hot air welders used for welding overlapping layers of thermoplastic roofing material.

2. Description of the Prior Art.

Conventional composition or asphalt roofs are now being replaced, particularly in commercial applications, by roofs covered and sealed by a thermoplastic sheet material. The thermoplastic material provides a superior, longer lasting roof which is ultimately more cost effective than composition or asphalt based roofs.

As with conventional roofing material, the thermoplastic roofing is manufactured in sheets and laid down on the roof in an overlapping manner in order to provide a weatherproof covering. Typically, one to three inches of material from adjacent sheets are overlapped and then welded together to form the weathertight seal. The heated overlapping thermoplastic sheeting is pressed together while in a soft, plastic state. The overlapping sections weld together as the soft plastic material from both overlapping portions intermingles and cools. A weathertight bond results. Any conventional means may be used to heat the overlapping layers to a plastic state including hand-held hot air blowers or large, flat soldering irons.

Since the number of running feet of such welds can be large, automated means have been devised to conveniently weld the overlapping sections of the thermoplastic sheets together. One such welder has been manufactured which is comprised of a three wheeled chassis having an electrically powered hot air blower mounted on the chassis, arranged and configured to deliver hot air to a shaped delivery port which is inserted between the overlapping sections of the thermoplastic sheeting. The welder is thus run down the length of the seam, thereby quickly and efficiently melting the adjacent surfaces of the thermoplastic material and then pressing the material together with a pressure wheel coupled to the chassis and positioned behind the shaped delivery port.

However, such a hot air welder is a relatively heavy and bulky device, measuring between one and two feet in width with a slightly greater length. The shaped delivery port through which the hot air is delivered is positioned on one side of the chassis and is held in a fixed orientation with respect to the chassis. The shaped delivery port must deliver air immediately to the adjacent surfaces of the overlapping thermoplastic material, and therefore must be shaped to reach around and between the overlapping sections of the sheeting. Depending upon which sheet is the top layer and the bottom layer of the overlapping section, the device must be positioned with respect to the overlapping section to allow the fixed, shaped delivery port to reach around and between the overlapping sections. In other words, if two sheets were laid with the left sheet overlapping the right sheet, the hot air welder would have to be positioned so that the delivery port could reach underneath the left and above the right sheet, extending generally from right to left. However, if the sheets were reversed so that the right sheet was above and overlapped the left sheet, the welder would have to be turned 180° so that the shaped delivery port would reach underneath the right sheet and above the left sheet. However, as mentioned above, the fixed, shaped delivery port is set on one side of the chassis so that the width of the chassis must be accomodated by the roofing layout, if the welder is to be turned and used to weld both left and right seams.

Most roofs include a large number of vertical obstructions or parapets which are also covered with roofing material. The inflexibility of the prior art device requires that all seams be spaced from such vertical obstructions by one to two feet if the welder is to be used. As a practical matter, it is not always possible to arrange for the spacing of seams at a one to two foot distance from every vertical obstruction on a roof. Therefore, in many cases seams, which are too close and have an orientation such that the prior art welder cannot be used, are welded by hand using a soldering iron or hand-held hot air blower. The time required to make such seams by hand is large and represents one of the most expensive labor components in a typical roofing job. Furthermore, hand welding roofing seams is tedious work which requires careful attention if a perfect seam is to be made. Due to the tedium of the work, it is difficult to maintain the attention required to make a perfect seal.

What is needed then are improvements to a hot air welder which will allow the use of the welder to make both inside and outside seams so that the welder can be used to make seams which are in close proximity to vertical obstructions on a roof without the necessity for reversing the welder to accomodate a reversed seam.

BRIEF SUMMARY OF THE INVENTION

The present invention is an improvement in a hot air welder for adjoining adjacent, overlapping layers of roofing material comprising a chassis, a heater assembly, and an air dam wherein the heater assembly has a shaped delivery port arranged and configured for disposition between two overlapping layers of roofing material. The shaped delivery port is coupled to the heater assembly so that it is reversible with respect to the chassis. By virtue of such reversability the shaped delivery port has an inside and outside orientation with respect to the chassis. The air dam is movably coupled to the chassis and is disposed in relation to the shaped delivery port and the chassis such that the air dam can be disposed in at least two predetermined positions with respect to the shaped delivery port. In one position the air dam is disposed between the shaped delivery port and the chassis when the shaped delivery port is arranged and configured to an inside orientation to manufacture inside seams. In the second case the shaped delivery port is disposed between the air dam and the chassis when the shaped delivery port is arranged and configured in an outside orientation to manufacture outside seams. The air dam forms, in part, a barrier in the underlying roofing material in order to confine hot air to the area in proximity to the shaped delivery port. The air dam urges the roofing material downwardly, thereby facilitating a close contact between the shaped delivery port and the overlapping portions of the roofing material. By means of this combination, a hot air welder is devised which is capable of manufacturing both inside and outside welded seams with equal ease and facility.

Many other improvements have been made in a hot air welder which are included within the scope of the present invention, and which can be better understood by considering a detailed description of the preferred embodiment in light of the following Figures wherein like elements are referenced by like numerals.

BRIEF DESCRIPTION OF THE DRAWINGS

FIG. 4 is a simplified diagramatic view showing the engagable transmission to the drive wheels as seen from section 4—4 of FIG. 3.

FIG. 5 is a plan view of a portion of the chassis showing the pressure wheel and the calibrated, adjustable means by which the pressure wheel is rotatably coupled to the chassis.

FIG. 6 is a sectional view taken through section 6—6 of FIG. 5 showing the means by which the pressure wheel of FIG. 5 is adjusted.

FIG. 7 is a rear view of the pressure wheel and its coupling to the chassis as seen from section 7—7 of FIG. 5.

FIG. 8 is a front view of the guide member also shown in side view in FIGS. 1 and 2 showing the adjustable means by which the guide member is coupled to the chassis.

FIG. 9 is a sectional view taken through section 9—9 of FIG. 8 showing the detent mechanism used with the guide member and the means for its adjustment relative to the chassis.

FIG. 10 is a plan view taken through section 10—10 of the guide member shown in FIG. 8.

FIG. 11 is a sectional view of the slidable tube disposed in the blower box which communicates the blower box with the heater assembly.

FIG. 12 is a plan view of a slidable gate valve used to control the amount of air introduced into the blower box as seen from section 12—12 of FIG. 11.

FIG. 13 is a sectional view of the slidable tube shown in FIG. 11 as seen through section 13—13 showing the detent mechanism for the slidable tube.

FIG. 14 is a sectional view of the slidable tube taken through section 14—14 of FIG. 11 illustrating the stop bars.

FIG. 15 is an end view showing portions of the shaped delivery port and air dam illustrating their relative position when oriented to make an inside weld, the chassis being assumed to lie to the left as viewed in FIG. 15.

FIG. 16 shows the relative position of the air dam and shaped delivery port when configured to manufacture an outside weld, again the chassis being assumed to lie to the left of the shaped delivery port as viewed in FIG. 16.

FIG. 17 is a plan view of a portion of the shaped delivery port as taken through section 17—17 of FIG. 15 showing the perforations and main port defined therein.

FIG. 18 is a partial side view of the air dam showing improvements made in the roller track coupled to the lower periphery of the air dam.

FIG. 19 is a plan view of the blower box showing the slidable tube and its adjustable detent mechanism with the means by which the blower box is "floated" on the chassis.

FIG. 20 is a sectional view taken through section 20—20 of FIG. 19 showing the adjustable coupling of the blower box to the chassis to allow it to "float" thereon.

FIG. 21 is the sectional view of FIG. 20 after the blower box has been shifted horizontally and vertically with respect to the chassis.

FIG. 22 is a partial plan view showing the first and second orientation of the air dam with respect to the pressure roller wherein the shaped delivery port has been deleted for the sake of clarity.

FIG. 23 is a sectional view taken through section 23—23 of FIG. 2 showing the detent mechanism by which the air dam of FIG. 22 may be positioned in the inside and outside orientation.

DETAILED DESCRIPTION OF THE PREFERRED EMBODIMENTS

The present invention is an improvement to a hot air welder for welding thermoplastic roofing material wherein the hot air welder is modified so that it is reversible and may manufacture both inside and outside seams with equal ease and facility; and whereby the operative elements of the welder are designed to be adjustable in a manner such that the quality and nature of the weld can be carefully controlled and adapted to the requirements of each work situation.

Figure 3:
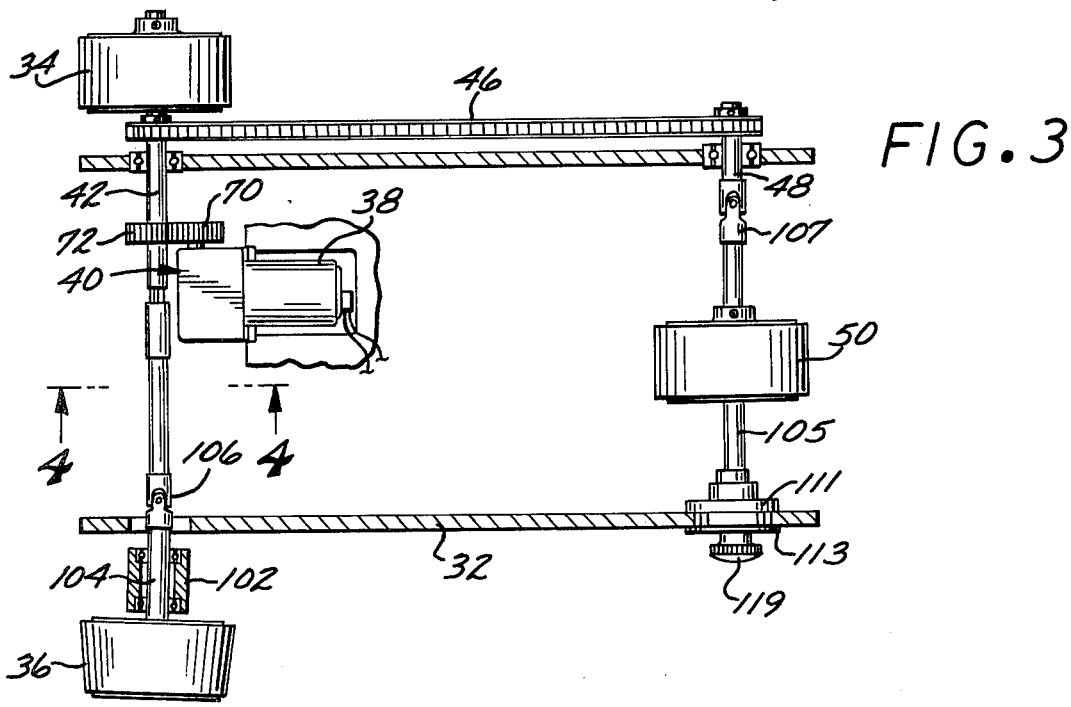
FIG. 3 is a simplified plan view diagramatically showing the chassis and its wheeled support, including the pressure wheel and tracking wheel.

The nature of the invention and its various embodiments are best understood by first viewing a side view of a welder improved according to the present invention. Welder 30 is built around a chassis 32. Chassis 32 is motor driven by a heavy duty, 110-volt electrical motor which drives rear wheels 34 and 36, and front wheel 50, which includes a pressure wheel 36 described in greater detail below. Motor 38, best shown in FIG. 3, is coupled to front wheel 50 and rear wheels 34 and 36 through a gear transmission 40 which is selectively engaged or disengaged with rear drive axle 42 by a transmission lever 44 best illustrated in FIG. 1. A flexible chain 46 couples drive shaft 42 with a front drive shaft 48, which in turn drives a front tracking wheel 50, again described in greater detail below.

Figure 1:
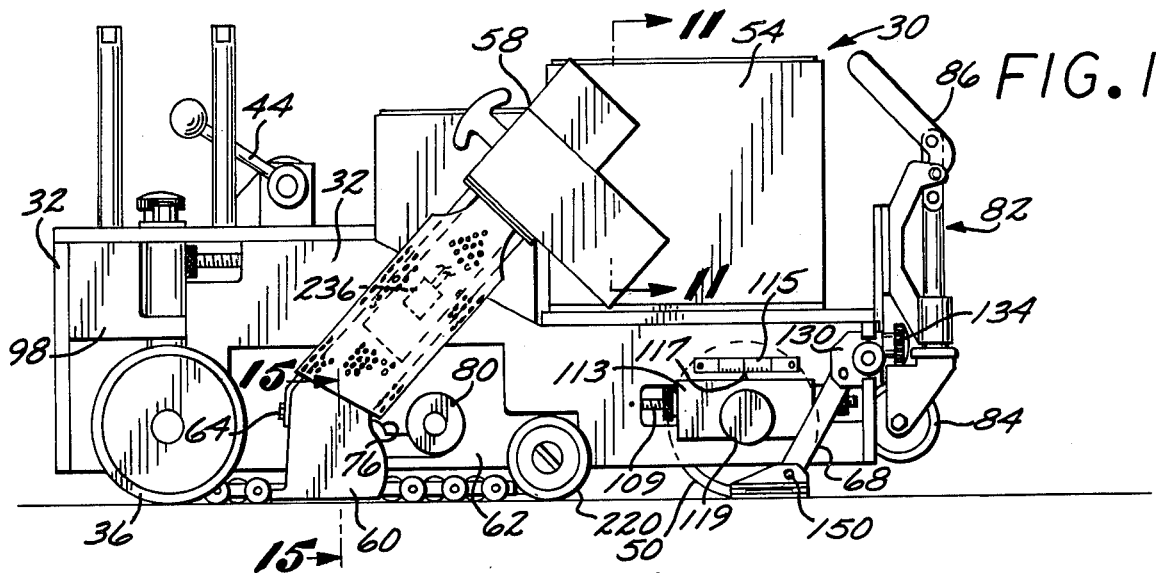
FIG. 1 is a side view of the improved hot air welder of the present invention showing the shaped delivery port and air dam in the inside orientation.

An air blower 52, illustrated in FIG. 11, mounted within a blower box 54, is shown in side view in FIG. 20. Air is delivered by blower 52 to blower box 54 and hence through a slidable delivery tube 56, best shown in FIG. 11, described in greater detail below, to a heater assembly 58, shown in FIG. 1. Heater assembly 58 terminates in a shaped delivery port 60. Air delivered by blower 52 through blower box 54 and delivery tube 56 is heated within heater assembly 58, which is a conventional electric heater, and ultimately delivered in the manner as determined by shaped delivery port 60 to overlapping layers of thermoplastic roofing material. As shown in FIG. 1, shaped delivery port 60 is arranged and configured in an inside orientation in which air dam 62 is disposed between shaped delivery port 60 and chassis 32. As will be better illustrated and discussed in connection with FIG. 15, shaped delivery port 60 delivers air between the overlapping layers toward the chassis in the inside orientation. When the overlap of the seam is reversed, shaped delivery port 60 is detached from heater assembly 58 by means of a conventional quick release mechanism 64 for insertion of an outside shaped delivery port 66, again better described in connection with FIG. 16. As will be discussed in greater detail below, when air dam 62 is arranged and configured in the outside orientation, air dam 62 is positioned outside heater assembly so that shaped delivery port 66 of FIG. 16 is disposed between chassis 32 and air dam 62 for the purposes of manufacturing an outside seam.

The improved hot air welder is shown in FIG. 1 in the operating position wherein heater assembly 58 is positioned to manufacture a weld and air dam 62 designed to provide at least a partial barrier to hot air delivered by shaped delivery port 60 to the overlapping portions of the roofing material lying thereunder. In addition, guide member 68 is shown in the operating position for slidable engagement with the roofing material. The roofing material in which the seams are to be manufactured have been omitted from the drawing of FIG. 1 for the sake of clarity.

Figure 2:
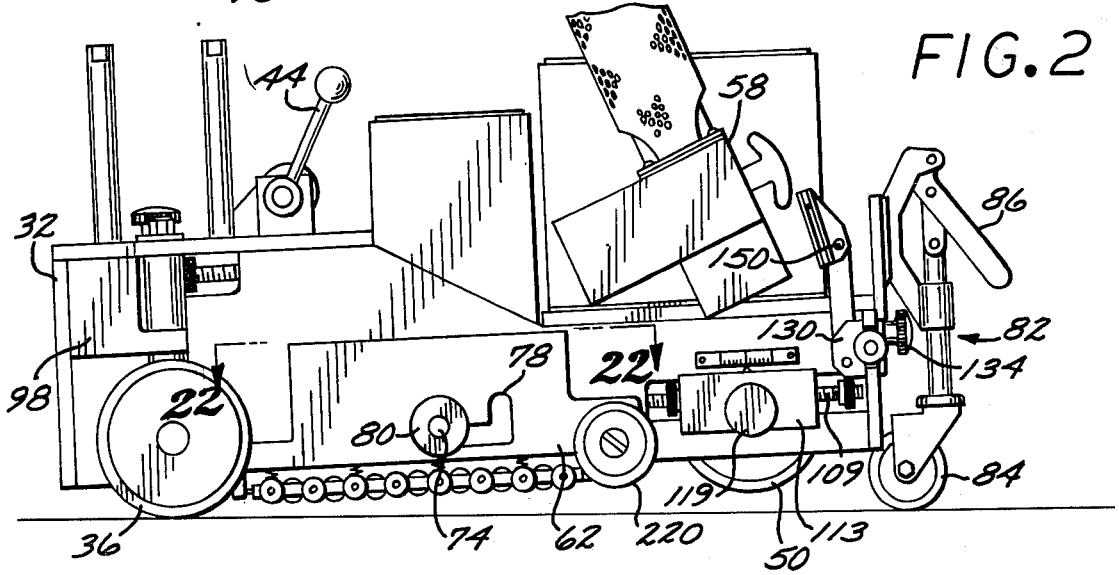
FIG. 2 is the side view of FIG. 1 showing the air dam, heater assembly, and chassis configured in a nonoperable position for ease of movement to a work location.

FIG. 2 shows the improved hot air welder of the present invention configured in the nonworking position to facilitate its movement to or between work positions. For example, gear transmission 40 has been disengaged by moving transmission lever 44 to the front position, thereby disengaging drive gear 70 from shaft gear 72 to allow wheels 34, 36 and 50 of welder 30 to free wheel. In addition, air dam 62 has been raised such that shaft 64 is positioned in slot indentation 76 shown in partial view in FIG. 1 and moved from slot indentation 78 shown in FIG. 2. Because of the differing depth of slot indentations 76 and 78 as illustrated in FIGS. 1 and 2 air dam 62 is raised by shifting air dam 62 to the position where shaft 74 is in disposed indentation slot 76. Air dam 62 is secured in place by a locking collar 80.

In addition, heater assembly 58 has been rotated to an upward position. Heater assembly 58 is coupled to slidable delivery tube 56 and the means by which heater assembly 58 is rotated between the working position as shown in FIG. 1 and the nonworking position as shown in FIG. 2 is described in greater detail below.

Finally, a levered rear support mechanism 82 is engaged when in the nonworking position of FIG. 2 to raise the rear end of welder 30 off the ground, thereby disengaging tracking wheel 50 from contact with the underlying surface. Mechanism 82 is shown as having a downwardly positioned swiveled idler wheel 84 which is operable by means of a compound linkage 86 well known to the art. Any other equivalent means could be used as well for mechanism 82 which would allow the disengagement of tracking wheel 50 from the underlying surface or otherwise to facilitate the free wheeling movement of welder 30.

The means by which motor 38 is engaged and disengaged from front drive shaft 42 is better shown in FIG. 4. Motor 38 is coupled to chassis 32 by means of a hinge 88. One leaf of hinge 88 is coupled to chassis 32 while the opposing leaf is coupled to casing 90 to which motor 38 is fixed and to which gear 70 is rotatably journaled. Movement of transmission lever 44 to the front position as shown in FIG. 2 rotates casing 90 in a clockwise direction as viewed in FIG. 4 thereby pulling gear 70 away from engagement with gear 72. Transmission lever 44 is rotatably coupled at a first pivot point 92 fixed with respect to chassis 32 and is coupled to arm 94. Arm 94 in turn is rotatably coupled to casing 90 at pivot point 96. Thus, as transmission lever 44 is rotated in a clockwise sense, arm 94 moves upward as viewed in FIG. 4, thereby causing casing 90 to rotate about hinge 88 to disengage gears 70 and 72. Engagement is effected simply by rotating transmission lever 44 in the position as shown in FIG. 4 until gears 70 and 72 mesh.

The quality and nature of the weld formed between overlapping portions of the thermoplastic material is determined in part by the relative disposition and orientation of pressure wheel 36 with respect to delivery port 60 or 66. FIG. 5 shows in plan view one improvement of the present invention whereby pressure wheel 36 may be adjusted. Chassis 32 extends outwardly and forwardly in the form of an arm 98 to which pressure wheel 36 is ultimately coupled as better shown and described in connection with FIG. 7. A "T"-shaped bar 100 is rotatably coupled about a pivot pin 102 to arm 98. "T"-shaped bar 100 in turn has a bearing 102 to which pressure wheel 36 is journaled to shaft 104. As better shown in FIG. 3, shaft 104 is rotatably coupled to bearing 102 and extends therethrough to a universal joint 106 through which shaft 104 is coupled to front drive shaft 42. Thus, the orientation of shaft 104 with respect to the plane of chassis 32 as illustrated in FIG. 3 may be selectively varied as described below. Positive drive of pressure wheel 36 is provided through a universal joint 106.

"T"-bar 100 is slotted at its opposing end 108 to facilitate adjustment and rotation of bar 100 about pivot pin 102. End 108 of bar 100 encloses a threaded shaft 110 best shown in FIG. 6. Shaft 110 is fixed with respect to chassis 32 and end 108 is slidable along the length of shaft 110. The position of end 108 of bar 100 is adjusted and fixed along the length of shaft 110, the limits of which are defined by a pair of knurled thumb wheels 112, best shown in FIG. 6 and also partially shown in plan view in FIG. 5. Thumb wheels 112 thereby allow a quick adjustment mechanism for change over between the inside and outside orientation of welder 30 once the settings are initially determined. As bar 100 is rotated about pivot pin 102, an indicator 114, which may be splined to pivot pin 102 or otherwise fixed with respect to bar 100, is rotatable with bar 100, so that indicator 114 provides a means for indicating the calibrated amount of adjustment in the orientation of pressure wheel 36 defined by thumb wheels 112. Indicator 114, in combination with calibration plate 116, is best shown in plan view in FIG. 5. Once adjusted to the desired orientation, pressure wheel 36 may be locked into position by means of locking wheel 118 which as shown in FIG. 7, closed indicator 114 against chassis 32 to fix its position with respect to chassis 32.

Pressure wheel 36 is in the shape of a right, conical section such that it has two sides of differing diameter, shown in greatly exaggerated view in FIGS. 5 and 7. The conical section of pressure wheel 36 aids in squeezing the plastic material in the desired direction. As pressure roller 36 rolls over the overlapped joint of the underlying thermoplastic roofing material, the roofing material is squeezed together by the weight of the welder exerted upon the joint through pressure wheel 36 and with a bias as determined by the conical section of pressure wheel 36. FIG. 7 illustrates the feature of the present invention whereby pressure wheel 36 is reversible with respect to its relative orientation to chassis 32. Shaft 104 is continued through bearing 102 to form the rotatable axle of pressure wheel 36. That portion of shaft 104 disposed within pressure wheel 36 is provided with a quick release which allows reversal of the wheel. For example, in FIG. 7, shaft 104 is provided with an annular detent groove 120 into which conventional spring loaded pins 122 engage. Pins 122 are disposed in threaded, radial holes 124 provided in pressure wheel 36. To insure the positive engagement between shaft 104 and pressure wheel 36, detent groove 120 may further be provided with mating pilot holes in which spring loaded pins 122 are disposed so that pressure wheel 36 can be positively driven by shaft 104.

Tracking wheel 50 is adjustable in a manner similar to that of pressure wheel 36. As best illustrated in FIG. 3, tracking wheel 50 is driven by shaft 48 through a universal coupling 107. Universal coupling 107 in turn is rigidly coupled to driven shaft 105, to which tracking wheel 50 is fixed. Therefore, the axis of rotation of tracking wheel 50 is adjustable in a plane generally parallel to the plane of chassis 32 by means of a screw type adjustment and lock means of the type similar to that described in connection with FIGS. 5–9. For example, threadable shaft 109, shown in FIG. 1, is provided with a pair of knurled and threaded thumb wheels used for limiting the position of flange plate 111 and 113 along a horizontal axis parallel to the axis of threaded shaft 109 similar to thumb wheels 112 of FIGS. 5 and 6. When adjusted to the proper location as determined by calibration plate 115 and pointer 117, thumb wheel 119 is tightened to squeeze flanges 111 and 113 together to lock rotatable axis 105 in the desired position, best illustrated in plan view in FIG. 3. Therefore, the angle of orientation of tracking wheel 50 may be easily adjusted to compensate for varying angles of slope on which welder 30 must run. In other words, to avoid slide slipping, it may be necessary to adjust tracking wheel 50 to compensate for such slippage by an amount which will maintain welder 30 in a straight track across the slope of the roof.

Guide member 68 as shown in FIGS. 1 and 2 is better illustrated in FIGS. 8–10. In FIG. 8, which illustrates guide member 68 as viewed from the front of welder 30, is adjustably coupled to chassis 32 by a mechanism similar to that shown in FIGS. 5–7 used to adjustably couple pressure wheel 36 to chassis 32. Again a threaded shaft 126 fixed with respect to chassis 32 is provided in an opening 128 defined therein. Guide member 68 as best shown in FIG. 9 is coupled to a flange plate 130 which is slidably disposed in opening 128. Flange plate 130 is coupled to an opposing flange plate 132, also slidably disposed in opening 128, by means of a threaded lock wheel 134. Thus, lock wheel 134 is loosened, allowing flange plate 130 and 132 to be disposed along opening 128 within the limits defined by threaded and knurled thumb wheels 136 disposed on each side of plates 130 and 132 and threaded on shaft 126. When the desired adjustment has been reached as indicated by pointer 138 and calibration plate 140, lock wheel 134 is tightened, thereby fixing guide member 68 in the desired position.

When in the operable position, as illustrated in FIG. 1, guide member 68 is positioned as shown in FIG. 9 with a spring loaded detent pin 142 engaging the pivoted end of guide member 68 coupled to flange plate 130 in a first position. When in the nonworking condition as shown in FIG. 2, guide member 68 is rotated upwards until detent pin 142 engages indentation 144 and thereby locks guide member 68 in the nonworking position.

In addition to being rotatable about pivot point 146 as shown in FIG. 9, guide member has a foot portion 148 illustrated in side view in FIG. 8 and in plan view in FIG. 10. Foot portion 148 is similarly rotated about pivot point 150, best shown in FIGS. 1 and 2.

Foot portion, shown in plan view in FIG. 10 and in side view in FIG. 8, includes an upper member 150 and lower member 152, separated by a central portion 154. FIG. 10 shows foot portion 148 taken through section 10—10 of FIG. 8 wherein only lower member 152 is illustrated together with central portion 154. Central portion 154 includes a pair of attaching posts 156 used to couple upper and lower members 152 and 154. Posts 156 may further be provided with rollers to facilitate the slidable engagement of foot portion 148 with roofing material 158. Although roofing material 158 is shown in FIGS. 8 and 10 as slidably coupled with foot portion 148 on both left and right sides of foot portion 148, during normal use roofing material 158 will engage foot portion 148 from only one side, namely that side defining the upper, overlapping portion of the seam. Slidably engagement with roofing material 158 has been shown in FIGS. 8 and 10 only for the purposes of illustration to indicate that foot portion 148 is arranged and configured to act as a guide member for both inside and outside seams with equal ease and facility.

Slidably tube 56 which couples blower box 54 with heater assembly 58 is best shown in sectional view in FIG. 11. Blower 52 is disposed within blower box 54 within a compartment 160 and communicates with the remaining portion of blower box 54 through open port 162. Slidable tube 56 has an open end 158 in communication with port 162 and serves as the outlet therefrom for blower box 54. Slidable tube 56 slides along the direction of its axis through journaling provided by slide bearings 164. Slidable tube 56 is arranged and configured to be positioned in a first and second position corresponding to the inside and outside orientation of heater assembly 58 and shaped delivery port 60 or 66. Tube 56 is shown in FIG. 19 in that position corresponding to the outside orientation of heater assembly 58, namely that position of tube 56 fully disposed within blower box 54. Slidable tube 56 has an annular detent groove 166 formed therein for mating with spring loaded detent pins 168 or 170. When mated with detent pin 168, tube 56 is in the outside orientation, and when mated detent pin 170, tube 56 is in the inside orientation. Detent pins 168 and 170 are adjustable with respect to blower box 54 and slidable tube 56 by means of an adjustment bars 172, shown in side view in FIG. 11 and better shown in plan view in FIG. 19. Each detent pin has a corresponding separate adjustable bar which may be translated in the direction of the axis of tube 56 by means of slot indentations 174 provided at each end of bar 172. In addition, adjustment bar 172 has a plurality of holes 176 defined therein, into any of which holes detent pins 168 and 170 may be threadably inserted. Thus, the position of heater assembly 58 and delivery port 60 or 66 with respect to blower box 54 or with respect to chassis 32 is entirely adjustable by the means just described.

FIG. 11 taken through section 11—11 of FIG. 1 also illustrates another feature of the present invention wherein slidable tube 56 is combined with two stop bars 178 and 182. The first stop bar 178 is positioned within blower box 54 with respect to chassis 32, such that tube 56 may be rotated only to that point where a radial pin 180 contacts first stop bar 178. Stop bar 178 allows tube 56 to be rotated and thus heater assembly 58 to be rotated to permit delivery port 60 to be positioned in the working position as illustrated in FIG. 1. Second stop bar 182 is positioned on blower box 54 such that radial stop member 180 contacts second stop bar 182 at a position which prohibits heater assembly 58 and thus shaped delivery port 60 from being rotated into the working position, thereby preventing shaped delivery port 60, which may be very hot or become very hot, from contacting pressure wheel 36 or any other operable portion of welder 30. Typically, pressure wheel 36 is made of rubber or other thermoplastic material such that contact with a hot metal surface, such as delivery port 60, will mar pressure wheel 36 and damage delivery port and thereby interfere with its performance. Therefore, second stop bar 182 is positioned in blower box 54 in such a position such that contact between delivery port 60 and pressure wheel 36 is prohibited. In any other position, slidable tube 56 is permitted to rotate until radial member 180 contacts first stop bar 178. Opposing radial pin 181 provides a limit to the extent to which heater assembly 58 may be rotated upwardly in the nonworking position of FIG. 2.

The operation of first stop bar 178 and second stop bar 182 in connection with radial member 180 is more graphically illustrated in cross section in FIG. 14, taken through section 14—14 of FIG. 11. Second stop bar 182 is shown in the background with radial member 180 clearly about to come into contact with first stop bar 178 whereby greater rotation of tube 56 is allowed in that position, where contact is made with first stop bar 178, than with second stop bar 182.

Tube 56 is also provided with a flat surface 184 parallel to the axis of tube 56 and running along its length. As shown in FIG. 13, flat 184 is engagable with spring loaded detent pin 186. When tube 56 is rotated into the position as shown in FIG. 2, pin 186 will engage flat 184 and tend to retain tube 56 in that orientation, however, quick release is provided simply by compressing pin 186 when tube 56 is forcibly rotated.

Yet another feature of the present invention is illustrated in FIG. 12 wherein a slidable gate 188 is provided across the input port to blower box 54 as better seen in cross section in FIG. 19. The intake of blower 52 is drawn from compartment 160 of blower box 54 which in turn has as its only input port that port defined by the opening controlled by slidable gate valve 188. Gate valve 188 may be of conventional design and in particular may have a stationary half 190 with a square aperture 192 formed therein. A movable portion 194 slides above member 190 and has a triangular notch 196 used to control the effective opening of aperture 192 to compartment 160. Member 194 is driven by a manually adjustable lead screw 28 having a finger wheel 200. By this means, blower 52 may be a fixed speed (RPM) or a constant rate blower. The amount of air delivered to heater assembly 58 and thus the temperature of air delivered to delivery port 60 is easily controlled by gate valve 188. Therefore, substantially more expensive, variable speed blowers as are used in the prior art can be avoided and replaced by the simple and inexpensive constant speed blower used in the present invention in combination with gate valve 188.

FIG. 15 taken from section 15—15 of FIG. 1 illustrates the relative position of air dam 62 and shaped delivery port 60 when configured in the inside orientation for the manufacture of what is defined herein as an inside well. For the purposes of illustration, it is assumed that chassis 32 is positiioned to the left of air dam 62 as seen in FIG. 15. Hot air is thus delivered between overlapping roofing layers 202 and 204, creating a thin, semi-liquid plastic layer which is later squeezed together by the following pressure wheel 36. Air dam 62 has a roller track 206 disposed on its lower periphery for pressing layer 202 tightly against roofing substrate 206. As described in greater connection with respect to FIG. 18, roller track 206 includes a double row of wheels, 208 and 210 which are resiliently urged by a plurality of springs 212 against the underlying roofing material 202. Thus, air dam 62 provides a means for forming a partial barrier or seal in roofing layer 202 against the leakage of hot air underneath air dam 62. If air were allowed to penetrate beneath air dam 62, portions layer 202 would tend to soften and form bubbles which would be permanently fixed in layer 202 as it solidified. Such bubbles are not only unsightly, but substantially degrade the integrity of the seal provided by layer 202.

FIG. 17 shows in plan view a better illustration of delivery port 60. In the illustrated embodiment, delivery port 60 includes a main outlet port 214 and a plurality of perforations 216 in its upper and lower lateral surfaces as best illustrated in FIGS. 15 and 16. Thus, hot air is delivered through port 60 into intimate contact with the adjacent layers of roof material 202 and 204 to heat these layers to a plastic state for welding.

FIG. 16 similarly shows the relative orientation of a second shaped delivery port 66 and air dam 62 where chassis 32 is assumed to lie to the left of port 66 as viewed in FIG. 16. The seam formed in roofing layers 202 and 204 in the configuration of FIG. 16 is defined here as an outside seam. Shaped delivery port 60 and 66 are identically shaped and manufactured ports with a reverse orientation and are interchangeably coupled through quick release mechanism 64 through the end of heater assembly 68, as described in connection with FIG. 1.

Another aspect of the present invention is the configuration of roller track 206 best illustrated in FIG. 18. Roller track 206 includes a central rail 218 to which the first plurality of rollers 208 are rotatably coupled and on the opposing side of which the second plurality of rollers 210 are coupled. Rollers 208 and 210 are each evenly spaced along their respective side of rail 218. However, plurality of rollers 210 are disposed on rail 218 in an offset manner with respect to plurality of rollers 208 so that rollers 208 and 210 form a substantial barrier to air flow in the underlying roofing material, and thus create a more evenly spaced downward pressure to effect a seal.

The disposition of air dam 62 between the orienations shown in FIGS. 15 and 16 are better understood in connection with the views illustrated in FIGS. 22 and 23. FIG. 22 shows a plan view of air dam 62 wherein air dam 62 is shown in solid outline in the inside orientation illustrated in FIG. 15. Heater assembly 58 and shaped delivery port 60 or 66 have been removed from the illustration in FIG. 22 for the sake of clarity. Air dam 62 is coupled to chassis 32 by means of a rotatble shaft 218. The horizontal attitude of air dam 62 is automatically assumed by virtue of the contact of wheel 220 with the underlying roofing material as shown in plan view in FIG. 22 and in side view in FIG. 1. Shaft 218, as shown in FIG. 23, extends across chassis 32 and is journaled by mating holes provided in chassis 32. Shaft 218 includes two annular detent indentations 222 and 224. A spring loaded detent pin 226 is disposed in a threaded hole provided in a lower portion of chassis 32 and mates with detent indentation 222 or 224 according to the position of shaft 218 with respect to chassis 32. Thus, air dam 62 may be quickly and easily pulled from the position shown in solid outline in FIG. 22 to the position diagramatically shown in dotted outline as determined by engagement of detent pin 226 with annular detent indentations 222 and 224 respectively.

Yet another aspect of the present invention is shown in FIG. 19, wherein blower box 54 is positioned on chassis 32 such that it "floats" or such that adjustment of blower box 52 with respect to chassis 32 may be altered by a predetermined amount in any horizontal or vertical direction. Blower box 54 is coupled to chassis 32 by means of two bolts 228 disposed through body holes defined in blower box 54. As better illustrated in FIG. 20, bolts 228 are disposed through wide apertures 230 defined in chassis 32 and are threadably engaged with a bar 232. Thus, bolts 228 may be loosened and blower box 54 either shimmed to increase the vertical height of blower box 54 with respect to chassis 32 or translated in any horizontal direction as permitted by the extent of apertures 230 in chassis 32.

FIG. 21 illustrates the configuration wherein blower box 54 has been shifted to the left as compared to its configuration in FIG. 20 and raised by means of shim 234. Although in the ordinary use of welder 30 it is not contemplated that it would be necessary to shift the gross position of blower box 54 with respect to chassis 32, the ability to do so increases the flexibility by which a welder of the present invention may be customized to producing the optimal weld for each work situation. Inasmuch as delivery port 60 or 66 is fixed in its relationship with respect to blower box 54, changing the orientation of blower box 54 with respect to chassis 32 thereby allows the change of orientation of the shaped delivery port with respect to pressure wheel 36, air dam 62, guide member 68 and any other operative element of the welder.

FIG. 1 also illustrates another feature of the present invention wherein a low-temperature sensor 236 is disposed within heater assembly 58 at a position to monitor the temperature of air exiting from heat assembly 58. When the air exiting heater assembly 58 falls below a predetermined value, sensor 236 will generate a signal which will be electrically coupled to a conventional circuit included within welder 30 to sound an audible alarm when welder 30 is in operation. The activation of the alarm may be conditioned upon the operation of welder 30 by any means well known to the art, such as by simply powering the audible alarm by the same on-off switch which is used to couple electrical power to drive motor 38. In this manner, the alarm will not sound when welder 30 is first set up and plugged, but will sound only as the drive motor is first turned on and then will automatically turn off when the drive motor is turned off or when heater assembly 58 has reached the appropriate operating temperature, indicating that use of welder 30 can commence. Thereafter, if at any time should temperature decrease for any reason, such as by a fluctuation in line voltage, the alarm will sound indicating to the operator that insufficient temperature is being generated to make an adequate weld. Details of the circuitry and the coupling between sensor 236 and the circuitry have been omitted from FIG. 1 for clarity, although electrical coupling to the circuitry may be provided by a pair of wires leading through heater assembly 58 and down slidable tube 56 to the circuitry, which may be included within blower box 54.

It must be understood that many modifications and alterations may be made to the improvements as disclosed herein without departing from the spirit and scope of the present invention. The embodiments described herein have been shown only for the purposes of illustration and clarity and are not intended to limit the scope of the following claims.

I claim:

1. An improvement in a hot air roof welder for joining adjacent, overlapping layers of thermoplastic material comprising:

a chassis;

a heater assembly having a shaped delivery port arranged and configured for disposition between two overlapping layers of thermoplastic material, said shaped delivery port being coupled to the remaining portion of said heater assembly so that said shaped delivery port is reversible with respect to said chassis, said shaped delivery port having an inside and outside orientation with respect to said chassis; and an air dam movably coupled to said chassis and disposed in relation to said shaped delivery port and chassis such that said air dam is disposed in a predetermined relationship with respect to said shaped delivery port, said air dam being disposed between said shaped delivery port and chassis when said shaped delivery port is arranged and configured in said inside orientation, said shaped delivery port being disposed between said air dam and said chassis when said shaped delivery port is arranged and configured in said outside orientation, said air dam forming in part in said thermoplastic material a barrier to confine hot air from said heater assembly to an area in proximity to said shaped delivery port and for downwardly urging said thermoplastic material thereby facilitating close contact between said shaped delivery port and said overlapping portions of said thermoplastic material, whereby a hot air welder is devised which is capable of manufacturing inside and outside welded seams with equal ease and facility.

2. The improvement of claim 1 wherein said air dam is provided with a multiplicity of rollers coupled to a track, said track being resiliently urged by a plurality of springs in a downward direction, forcing said plurality of rollers in contact with said thermoplastic material.

3. The improvement of claim 2 wherein said track is provided with a plurality of rollers on each side thereof.

4. The improvement of claim 3 wherein said plurality of rollers on each side of said track are disposed thereon with equal spacing, said rollers on one side of said track being offset with said rollers on the opposing side of said track such that said plurality of rollers on both sides of said track form in said thermoplastic material lying thereunder at least a partial barrier to air flow under said air dam and across said track in a generally perpendicular direction to the length of said track underneath said thermoplastic material.

5. The improvement of claim 1 or 2 further comprising a pressure wheel rotatably coupled to said chassis and disposed proximate to said shaped delivery port and behind said port with respect to the direction of forward travel of said chassis and delivery port, said pressure wheel particularly characterized by being rotatably coupled to said chassis through a flexible coupling to permit rotation of said pressure wheel about a vertical axis generally perpendicular to the plane of said thermoplastic material.

6. The improvement of claim 5 wherein said pressure wheel is a right conical section wherein said pressure wheel is reversible with respect to its axis of rotation so that the smaller diameter of said right conical section may be selectively disposed toward or away from said chassis.

7. The improvement of claim 1 wherein said shaped delivery port is coupled to the output portion of said heater assembly through a quick release mechanism wherein said shaped delivery port may be selectively positioned to said inside and outside orientation.

8. The improvement of claim 1 wherein said chassis includes a tracking wheel rotatably coupled thereto through a flexible coupling, the axis of rotation of said tracking wheel lying in a plane generally parallel to the place of said thermoplastic material and being selectively oriented in said parallel plane to permit orientation of said tracking wheel at an angle with respect to the forward direction of travel of said chassis.

9. The improvement of claim 1 further comprising an adjustable guide rotatably coupled to said chassis, said guide being disposed in advance of said shaped delivery port, and arranged and configured to engage said thermoplastic material, engagement of said guide with said thermoplastic material serving to direct said chassis along the edge of said thermoplastic material and to position said shaped delivery port within the overlap of said thermoplastic material.

10. The improvement of claim 9 wherein said guide includes an inside and outside guide portion for engaging said thermoplastic material when said shaped delivery port is positioned in said inside and outside orientation respectively.

11. The improvement of claim 10 wherein said inside and outside guide portion each includes an upper and lower engaging member, said thermoplastic material being disposed between said upper and lower member and against a central portion of said guide, said thermoplastic material being in slidable contact with said upper and lower member and said central portion of said guide so that said guide positively engages said thermoplastic material to insure accurate alignment of said chassis and heater assembly therewith.

12. The improvement of claim 1 wherein said heater assembly is coupled to a slidable tube, said slidable tube communicating with an air blower also coupled to said chassis, said slidable tube having a first detent position for aligning said shaped delivery port in said inside orientation and a second detent position for aligning said shaped delivery port in said outside orientation.

13. The improvement of claim 12 wherein said tube has a flat surface defined on one side thereof, said flat surface engaging a detent mechanism included within said chassis, so that said tube may be rotated to a position wherein said flat surface and detent mechanism are engaged, said position being that in which said heater assembly is rotated upwardly away from said thermoplastic material for positioning while not in use.

14. The improvement of claim 13 wherein said chassis includes a first and second bar stop and wherein said tube includes a post member radially extending from said tube, said first bar stop being positioned on said chassis with respect to said first and second detent positions to permit rotation of said tube to a working position when in said first and second detent position, corresponding to said inside and outside orientation respectively, said second bar stop being positioned on said chassis with respect to said first and second detent positions to prohibit rotation of said tube to said working position and to prohibit rotation of said tube to a position wherein said shaped delivery port can contact said pressure roller, said post extending from said tube contacting said first and second bars to permit or prohibit rotation of said tube respectively, whereby said pressure roller is protected from inadvertent damage by contact with said delivery port.

15. The improvement of claim 1 wherein said hot air welder includes an air blower and wherein said heater assembly communicates with said air blower through an adjustable gate valve to selectively control the amount of air communicated between said blower and heater assembly thereby varying the temperature of air discharged by said heater assembly through said shaped delivery port, so that said air blower may operate at a fixed output speed, not withstanding variable airflow delivered therefrom to said heater assembly.

16. The improvement of claim 1 further comprising a low temperature alarm means coupled to said heater assembly, said low temperature alarm means for generating an alarm indicative of an inadequate temperature of air delivered by said heater assembly when said hot air welder is operating.

17. The improvement of claim 1 where said hot air welder further includes an air blower communicating with said heater assembly, communication of air from said air blower to said heater assembly being provided by a blower box coupled to the output of said air blower, said blower box being coupled to said chassis, said heater assembly being coupled to said blower box, the coupling of said blower box to said chassis being adjustable to allow a selected, variable orientation of said blower box with respect to said chassis, so that the orientation of said heater assembly and shaped delivery port with respect to said chassis may be adjusted for changes in relative orientation.

18. An improvement in a hot air welder for welding overlapping and adjacent thermoplastic materials, said hot air welder including an air blower, said improvement comprising:
  a chassis;
  a heater assembly communicating with said air blower through a slidable tube, said slidable tube having a first detent and second detent position with respect to said chassis;
  a shaped delivery port removably coupled to the output of said heater assembly arranged and configured to be disposed between overlapping portions of said adjacent thermoplastic material;
  a blower box coupled to said chassis, the output of said air blower communicating with said blower box, and said slidable tube being slidable within and disposed in said blower box and communicating therewith; and
  an air dam coupled to said chassis,
  wherein said shaped delivery port is selected from a first shaped delivery port for an inside seam welding position and a second shaped delivery port for an outside seam welding position and is coupled to said heater assembly through a quick release mechanism, said heater assembly and said shaped delivery port being arranged and configured to said inside seam welding position when said tube is disposed in said first detent position, and wherein said heater assembly and shaped delivery port is configured and disposed in said outside seam welding position when said tube is disposed in said second detent position, said air dam being selectively disposable with respect to said chassis and coupled thereto in an inside position between said shaped delivery port and chassis when said shaped delivery port is configured in said inside seam welding position, and said dam being positioned outside said shaped delivery port when said shaped delivery port is configured and disposed in said outside seam welding position, whereby said hot air welder for welding seams in thermoplastic material may be reversibly configured to weld either inside or outside seams with equal ease and facility.

19. The improvement of claim 18 wherein said air dam is provided with a roller track resiliently coupled to its lower periphery, said roller track having a first and second plurality of rollers rotatably disposed along an inside and outside edge of said track, said resilient coupling between said track and air dam urging said plurality of rollers downward in contact with said thermoplastic material to temporarily assist in sealing said thermoplastic material against large airflow leaks while said shaped delivery port is disposed between overlapping portions of said adjacent thermoplastic material and before said adjacent thermoplastic material has been welded thereby, said first plurality of rollers on one side of said track being regularly spaced and offset from said second plurality of rollers disposed on said opposing side of said track, said second plurality of rollers also being regularly spaced so that said rollers apply an evenly spaced downward pressure on said thermoplastic material.

20. The improvement of claim 18 wherein said slidable tube is coupled to said heater assembly and disposed within said blower box, said tube being provided with a flat surface along one side thereof, and wherein said blower box includes a detent engagement means disposed so as to resiliently engage said flat surface when said slidable tube is rotated to a nonworking position, said nonworking position being that position in which said heater assembly coupled to said slidable tube is rotated upwardly and away from said thermoplastic material.

21. The improvement of claim 20 further including a first and second stop bar disposed within said blower box, and a stop pin disposed on said tube and radially extending therefrom, said first and second stop bar disposed in said blower box with respect to said first and second detent position of said tube so that rotation of said tube in said first and second detent position rotates said stop pin past said second stop bar to said first stop bar where said stop pin contacts said first stop bar and prevents further rotation of said tube, said tube being rotated in a working position to allow said delivery port to contact said thermoplastic material when said stop pin contacts said first bar, said second stop bar being positioned in said blower box with respect to said first and second detent position of said tube so that rotation of said tube at any transverse position of said tube within said blower box other than said first and second detent position causes said stop pin to contact said second stop bar, said tube being in a rotated position wherein said delivery port is prevented from contacting any other part of said hot air welder when said stop pin is in contact with said second stop bar, whereby inadvertent damage to said hot air welder is prevented.

22. The improvement of claim 18 wherein said hot air welder includes a pressure wheel disposed behind said delivery port to press said overlapping portions of said thermoplastic material together just after being heated by means of said shaped delivery port and wherein said hot air welder includes a tracking wheel rotatably coupled to said chassis, said pressure wheel being flexibly and rotatably coupled to said chassis to permit selective orientation of said pressure about a vertical axis substantially perpendicular to the plane of said thermoplastic material, said tracking wheel being rotatably and flexibly coupled to said chassis to permit selective orientation of the axis of rotation of said tracking wheel in a plane generally parallel to the plane of said thermoplastic material, whereby the direction of pressure applied to a newly formed weld may be selectively altered and whereby tracking control of said chassis may be selectively altered to accomodate variable slopes.

23. The improvement of claim 22 wherein said pressure wheel is a right conical section having a left side and right side diameter of differing dimension, wherein said pressure wheel is rotatably coupled to said chassis through quick release mechanism to allow reversal of said wheel with respect to its axis of rotation to selectively permit said left and right side of said wheel to be disposed toward said chassis.

24. The improvement of claim 18 further including a sheet guide rotatably coupled to said chassis having an upper and lower member centrally coupled to permit said thermoplastic material to be disposed between said upper and lower member on either side of said central coupling, said upper and lower member loosely and slidably engaging said thermoplastic material when said sheet guide is rotated downward into a working position adjacent said thermoplastic material, whereby visual guidance of said hot air welder is facilitated.

25. The improvement of claim 18 wherein said air blower communicates with said blower box, the output of said blower box being delivered to said heater assembly through a sliding gate valve and wherein said air blower has a fixed output rate so that a variable rate of air may be delivered to said heater assembly from said air blower operating a fixed speed.

26. The improvement of claim 18 wherein said heater assembly includes a low temperature alarm means for generating an audible alarm when said air blower is operating to indicate that air of an insufficient temperature is being delivered from said heater assembly to said delivery port.

27. The improvement of claim 18 wherein said blower box is coupled to said chassis and variably oriented with respect thereto, said slidable tube and heater assembly having a fixed angular and spatial orientation with respect to said blower box so that adjustments in the orientation of said delivery port with respect to all remaining portions of said hot air welder may be made by selectively orienting said blower box.

28. A method for welding overlapping portions of adjacent layers of thermoplastic material with the use of a hot air welder when said overlapping portions are in the form of both inside and outside seams and disposed near a vertical obstruction by a distance less than the width of said hot air welder, said method comprising the steps of:

selectively configuring a delivery port coupled to a heater assembly included within said hot air welder to an inside or outside orientation corresponding to said inside or outside seam respectively;

selectively disposing an air dam on one side of said seam and to one side of said delivery port corresponding to whether said seam is an inside seam or outside seam, said air dam being disposed on that layer of thermoplastic material having its overlapping portion superior to said adjoining layer of thermoplastic material, said shaped delivery port being disposed between said overlapping portions of said thermoplastic material, said air dam serving to provide at least a partial barrier to air flow from said delivery port between said adjoining layers of thermoplastic material, whereby inside and outside seams may be welded with a single, reversible and adjustable hot air welder with equal ease and facility.

* * * * *